US012231723B2

(12) United States Patent
Barbosa et al.

(10) Patent No.: US 12,231,723 B2
(45) Date of Patent: Feb. 18, 2025

(54) SYSTEMS AND METHODS FOR SPLICING TARGETED CONTENT INTO LIVE BROADCAST STREAMS WITH TARGETED CONTENT BREAKS OF UNKNOWN PLACEMENT AND DURATION

(71) Applicant: Netflix, Inc., Los Gatos, CA (US)

(72) Inventors: Flavio Ribeiro Nogueira Barbosa, Brooklyn, NY (US); Mark Watson, San Francisco, CA (US); Wei Wei, Plano, TX (US)

(73) Assignee: Netflix, Inc., Los Gatos, CA (US)

( * ) Notice: Subject to any disclaimer, the term of this patent is extended or adjusted under 35 U.S.C. 154(b) by 34 days.

(21) Appl. No.: 18/351,432

(22) Filed: Jul. 12, 2023

(65) Prior Publication Data

US 2025/0024098 A1    Jan. 16, 2025

(51) Int. Cl.
*H04N 21/44* (2011.01)
*H04N 21/2187* (2011.01)
*H04N 21/845* (2011.01)

(52) U.S. Cl.
CPC ... *H04N 21/44016* (2013.01); *H04N 21/2187* (2013.01); *H04N 21/8455* (2013.01)

(58) Field of Classification Search
CPC ......... H04N 21/44016; H04N 21/2187; H04N 21/8455
See application file for complete search history.

(56) References Cited

U.S. PATENT DOCUMENTS 10,762,531 B2    9/2020   Feldman et al.

FOREIGN PATENT DOCUMENTS

EP       4 080 894 A1 * 10/2022   ........... H04N 21/234

* cited by examiner

*Primary Examiner* — Anthony Bantamoi
(74) *Attorney, Agent, or Firm* — Greenberg Traurig, LLP

(57) ABSTRACT

The disclosed computer-implemented methods and systems can splice targeted content such as advertisements into a live stream of a real-time event. For example, the methods and systems discussed herein determine targeted content items for splicing into a live stream by generating a computing model of targeted content recommendations. In one or more examples, the computing model generates targeted content recommendations that are specific to a length of a targeted content break, the viewer of the live stream, and the player where the live stream is being viewed. The systems and methods discussed herein further determine the placement and duration of targeted content breaks based on signals and markers that are inserted into the live stream. Various other methods, systems, and computer-readable media are also disclosed.

20 Claims, 9 Drawing Sheets

SYSTEMS AND METHODS FOR SPLICING TARGETED CONTENT INTO LIVE BROADCAST STREAMS WITH TARGETED CONTENT BREAKS OF UNKNOWN PLACEMENT AND DURATION

BACKGROUND

Streamed media content, including TV shows and movies, is a common form of entertainment. For example, streaming platforms transmit media data to client-side media players. The media players play the media data for a viewer to watch. While some media played by a media player is pre-recorded (e.g., a TV show or movie that has already been produced), some streaming platforms enable streaming of live media. To illustrate, some streaming platforms stream media data associated with a live event (e.g., a sports game, a comedy special, a music concert) in real-time. In response to receiving this real-time media data, the client-side media players play the real-time media data for viewing.

Content creators often insert targeted content into the playback of media data. For example, some streaming platforms allow for targeted content such as advertisements to be inserted into pre-recorded TV shows and movies. For example, some streaming platforms insert advertisement breaks into the pre-recorded media and then splice advertisements into the breaks when the pre-recorded media is played by the media player.

Most streaming platforms, however, experience difficulties when attempting to splice targeted content into a live broadcast stream. For example, live broadcast streaming is fundamentally different from pre-recorded content playback in that targeted content placement opportunities are not predefined in a live event stream but instead can happen anytime during the broadcast. Moreover, it is common for a targeted content break to be terminated early during a live event. For example, a two minute targeted content break may be terminated at ninety seconds due to players returning to the field earlier than expected during a sports game. Additionally, most streaming platforms fail to effectively provide targeted content that is highly customized (e.g., to a viewer or geographic area) due to the speed with which real-time playback of the live event occurs.

SUMMARY

As will be described in greater detail below, the present disclosure describes implementations that splice targeted content into a live broadcast stream even though insertion points and durations are unknown. For example, implementations include generating, by a client media player, a request for an initial length of targeted content according to a computing model of targeted content recommendations, transmitting, along a communication channel between the client media player and a content delivery system, the request for the initial length of targeted content in combination with a request for a live stream of live broadcast media segments, receiving, along the dedicated communication channel, the initial length of targeted content and the live stream of live broadcast media segments, and in response to detecting a targeted content initialization marker at a current playback position of an additional broadcast media segment in the live stream, splicing the initial length of targeted content into the live stream at the targeted content initialization marker.

In some examples, the implementations further include generating the computing model of targeted content recommendations by receiving, from a digital content system, content recommendation information that is specific to one or more of a user of the client media player or a location of the client media player, receiving, from the digital content system, a manifest of targeted content items corresponding to the content recommendation information, and generating the computing model of targeted content recommendations based on the content recommendation information and the manifest of targeted content items.

Additionally, in some examples, the implementations further include, in response to receiving the initial length of targeted content, buffering the initial length of targeted content until the targeted content initialization marker is detected in the live stream. In additional examples, the implementations also include detecting a targeted content insertion signal in the live stream prior to detecting the targeted content initialization marker and loading the initial length of targeted content for splicing into the live stream at the targeted content initialization marker. Moreover, in some examples, the live stream includes one or more live broadcast media segments that are played at a regular timed cadence.

Some examples also include inserting blacked-out live broadcast media segments into the live stream until detecting a targeted content end marker. Also, some examples further include detecting the targeted content end marker in the live stream and resuming playback of the live broadcast media segments in the live stream.

Furthermore, some examples also include detecting a targeted content early termination signal prior to detecting the targeted content end marker in the live stream and, upon detecting an early termination marker corresponding to the targeted content early termination signal, stopping targeted content playback, ignoring blacked-out media segments from the live stream, and resuming playback of the live broadcast media segments in the live stream.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including generating a request for an initial length of targeted content according to a computing model of targeted content recommendations, transmitting, along a communication channel between the client media player and a content delivery system, the request for the initial length of targeted content in combination with a request for a live stream of live broadcast media segments, receiving, along the communication channel, the initial length of targeted content and the live stream of live broadcast media segments, and in response to detecting a targeted content initialization marker at a current playback position of an additional broadcast media segment in the live stream, splicing the initial length of targeted content into the live stream at the targeted content initialization marker.

In some examples, the above-described method is encoded as computer-readable instructions on a computer-readable medium. In one example, the computer-readable instructions, when executed by at least one processor of a computing device, cause the computing device to generate a request for an initial length of targeted content according to a computing model of targeted content recommendations, transmitting, along a communication channel to a content delivery system, the request for the initial length of targeted content in combination with a request for a live stream of live broadcast media segments, receiving, along the communication channel, the initial length of targeted content and the live stream of live broadcast media segments, and in response to detecting a targeted content initialization marker at a current playback position of an additional broadcast media segment in the live stream, splicing the initial length of targeted content into the live stream at the targeted content initialization marker.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
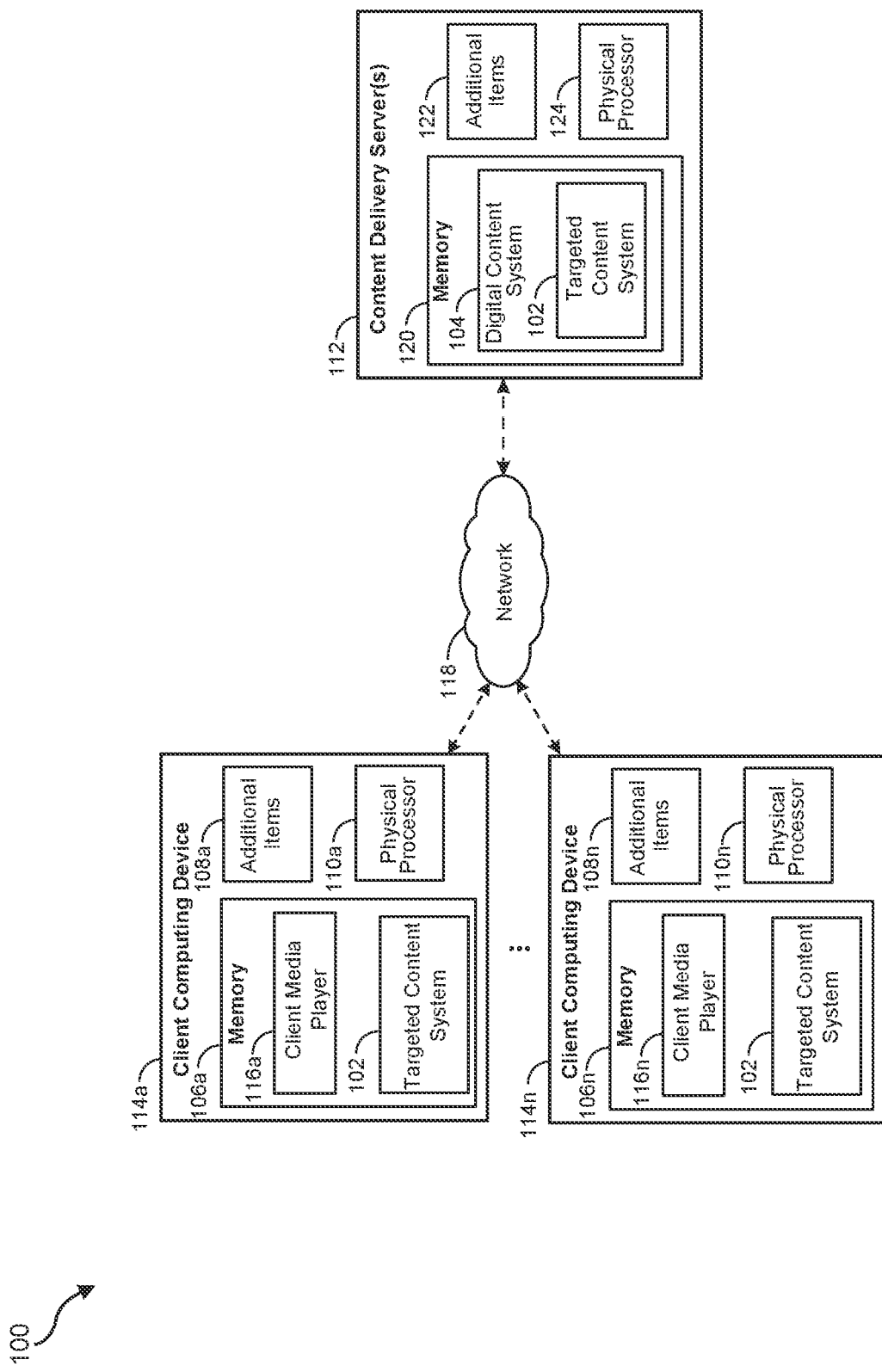
FIG. 1 is a block diagram of an exemplary environment for implementing a targeted content system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, most streaming platforms fail to effectively provide targeted content during live media broadcasts. For example, most streaming platforms cannot define targeted content placement opportunities for targeted content ahead of time in connection with a live stream of media segments. Instead, placement opportunities are generally dictated and/or modified according to the event being broadcasted via the live stream. As such, viewers often experience moments of "dead air" (e.g., blank frames, paused content) when a placement opportunity arises as these streaming platforms scramble to load targeted content into the live stream. Additionally, viewers also experience abrupt cutoffs of targeted content when a targeted content break is cut short due to something unexpected happening during the event depicted in the live stream. These issues with "dead air" and abrupt transitions are further exacerbated when existing streaming platforms attempt to provide targeted content that is highly customized and/or relevant to viewers because of the real-time nature of live event broadcasts.

To address these problems, the present disclosure describes a system that effectively splices customized targeted content into a live stream of an event with smooth transitions, even when the insertion opportunities in the live stream are at unknown positions with undefined durations. For example, as part of an initial handshake protocol between a client media player and a content delivery network, the disclosed system generates a computing model of targeted content recommendations. To illustrate, the computing model of targeted content recommendations includes a flexible graph of recommendations that are tailored to: 1) an expected amount of targeted content playback time during the live event, 2) a user of the client media player where the live stream is being viewed; and/or 3) a geographic area associated with the client media player. Then, during the real-time playback of a live event, the disclosed system buffers and pre-loads portions of targeted content recommended by the computing model. Upon detecting an upcoming insertion point in the live stream, the disclosed system further plays the same targeted content via the client media player. Thus, by using the computing model of targeted content recommendations in combination with detecting insertion points ahead of time in the live stream, the disclosed system intelligently and seamlessly provides highly-customized targeted content in a live stream.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
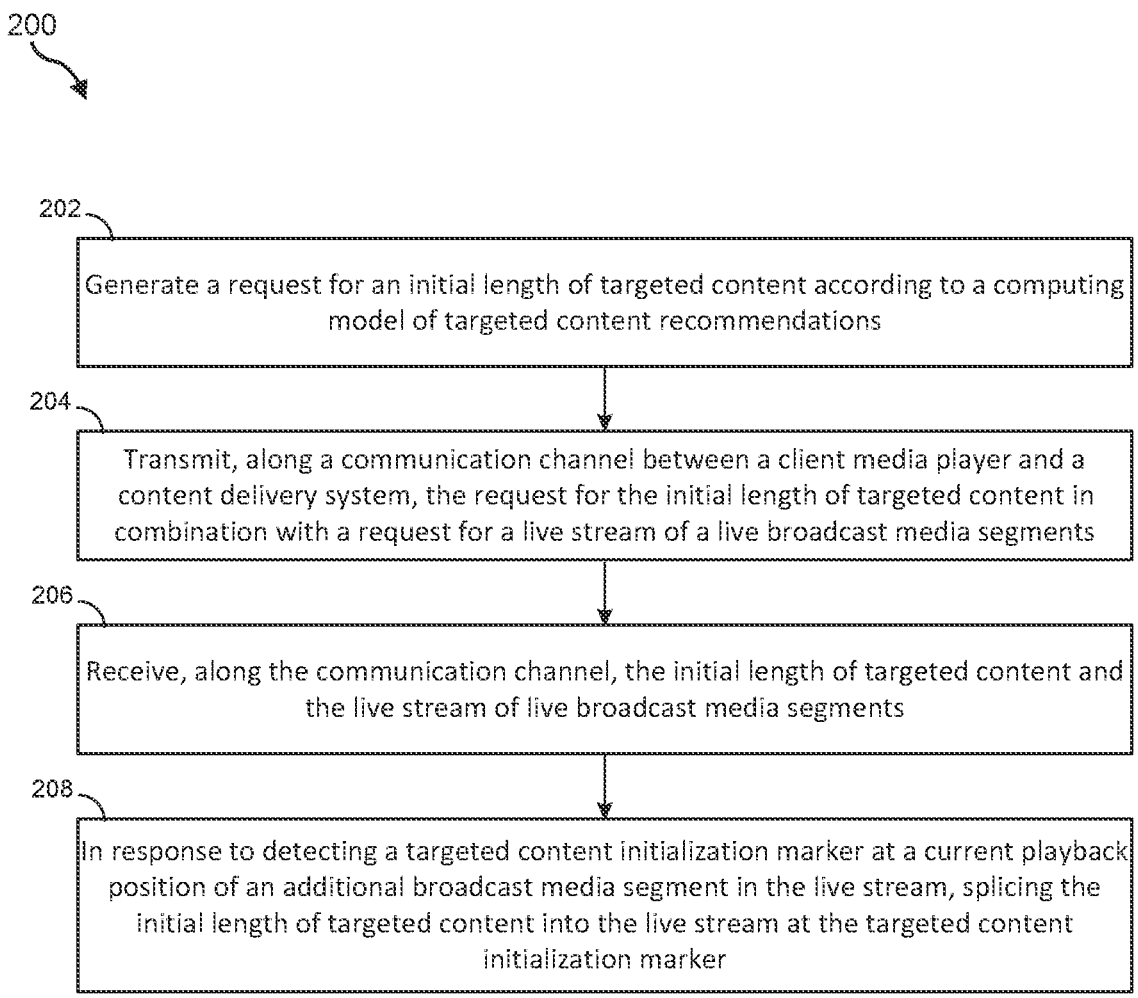
FIG. 2 is a flow diagram of an exemplary computer-implemented method for splicing targeted content into a live stream in accordance with one or more implementations.
Figure 3A:
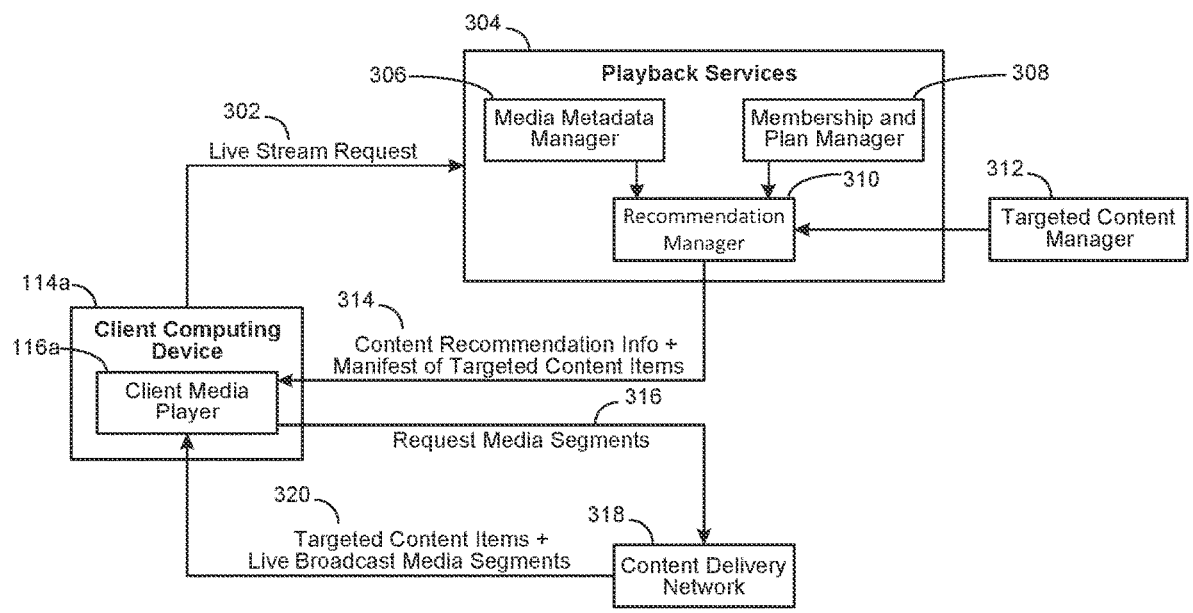
FIGS. 3A-3E illustrate the targeted content system establishing a connection to a content delivery server and splicing targeted content into a live stream in accordance with one or more implementations.
Figure 3B:
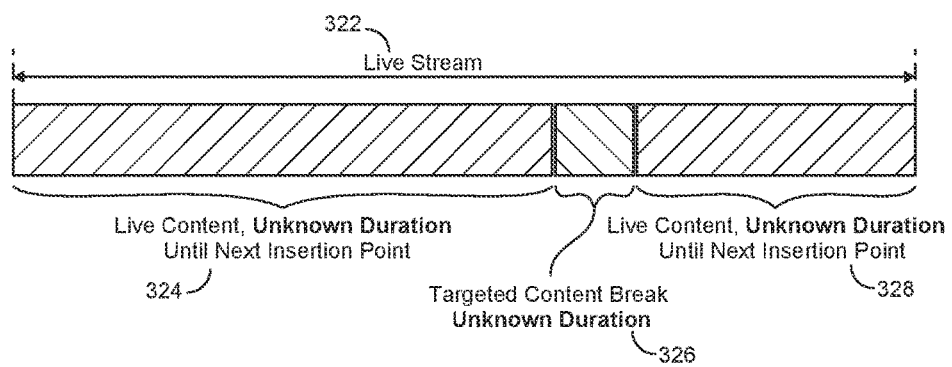
Figure 3C:
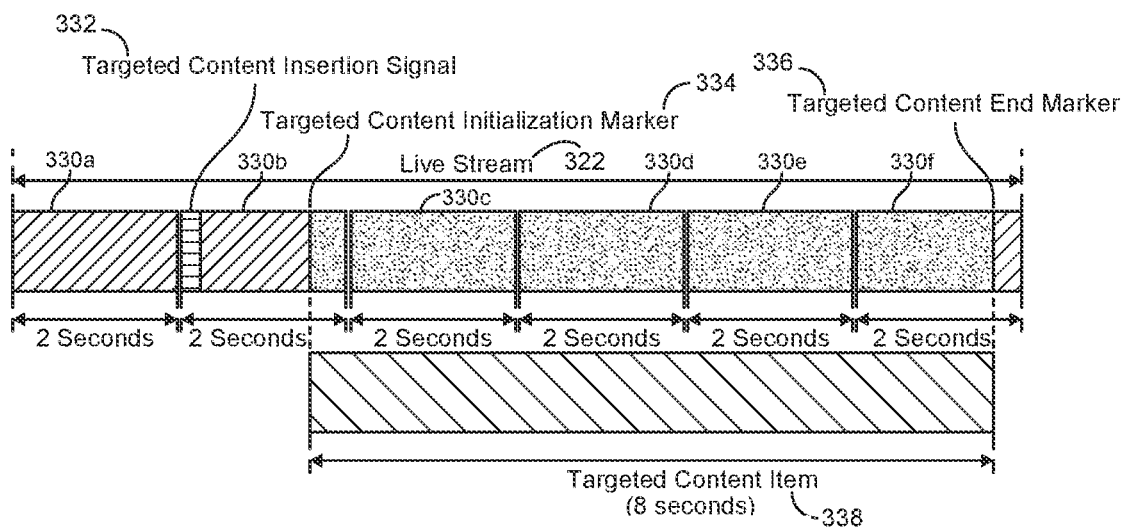
Figure 3D:
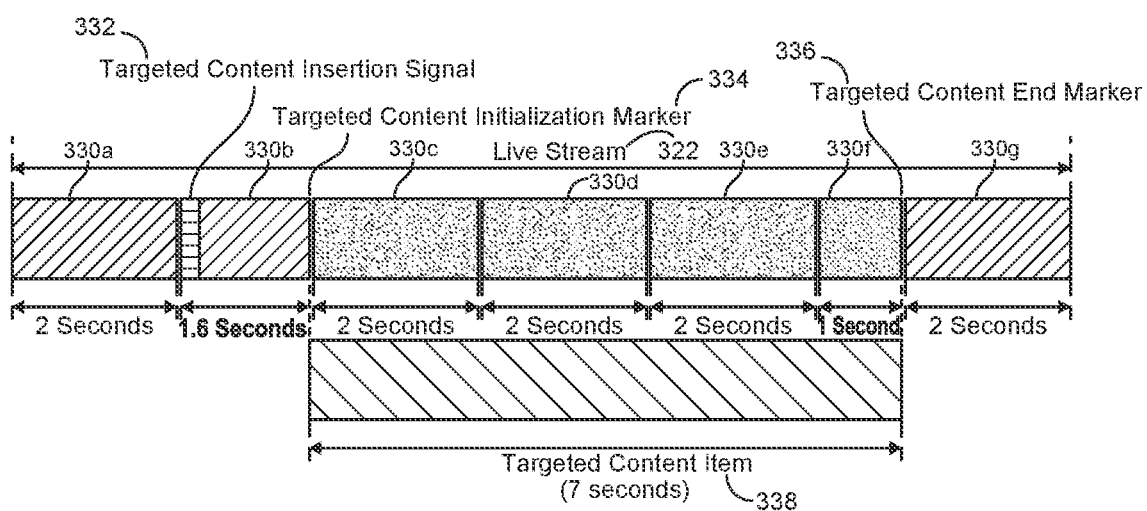
Figure 3E:
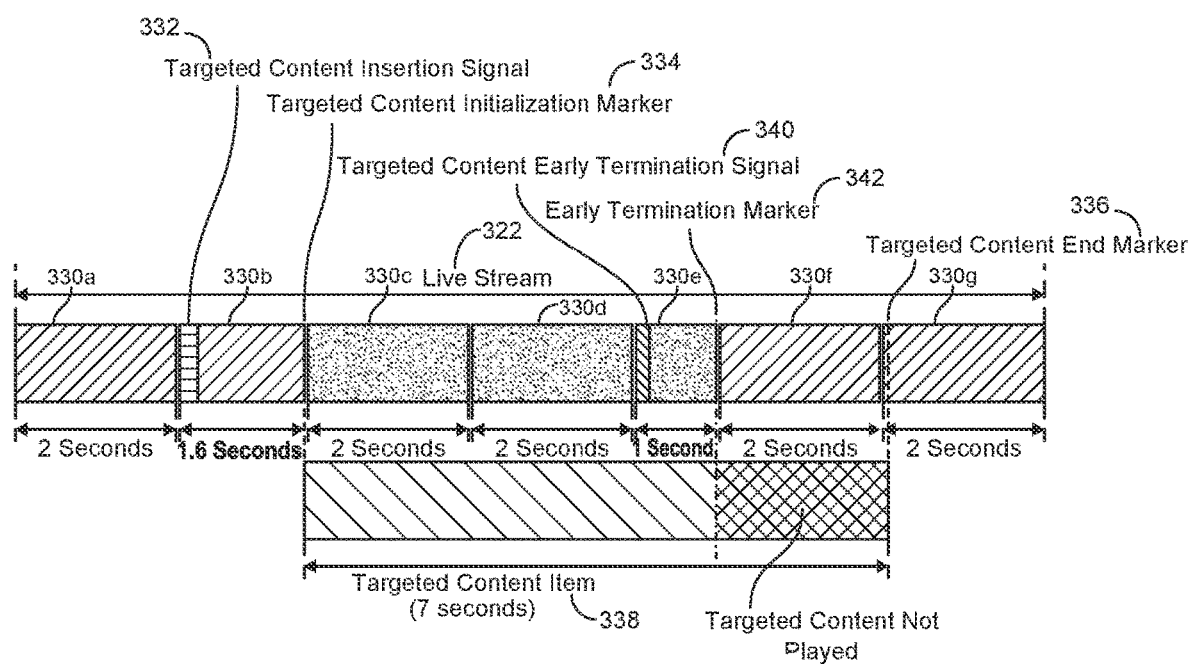
Figure 4:
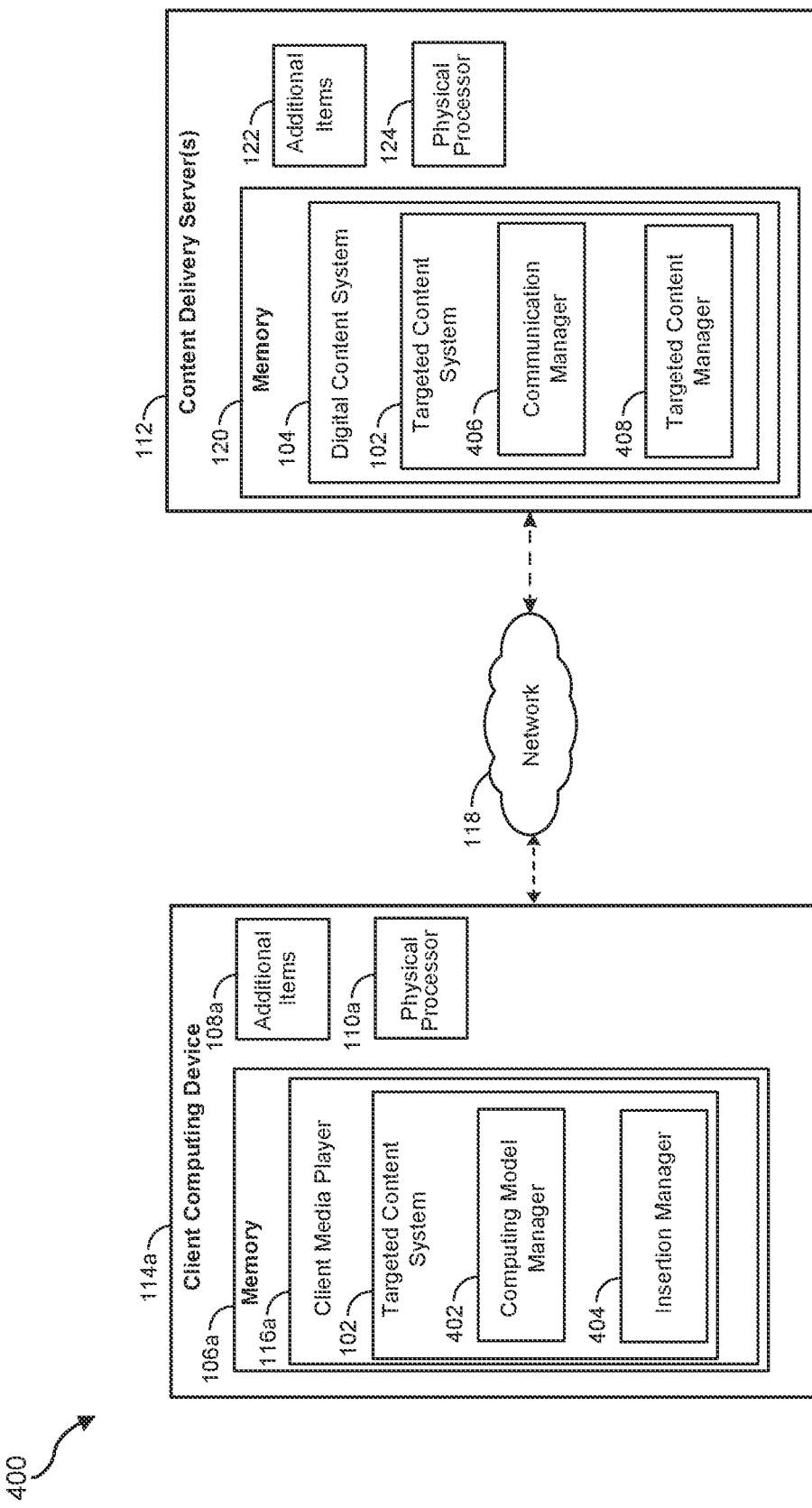
FIG. 4 is a detailed diagram of the targeted content system in accordance with one or more implementations.
Figure 5:
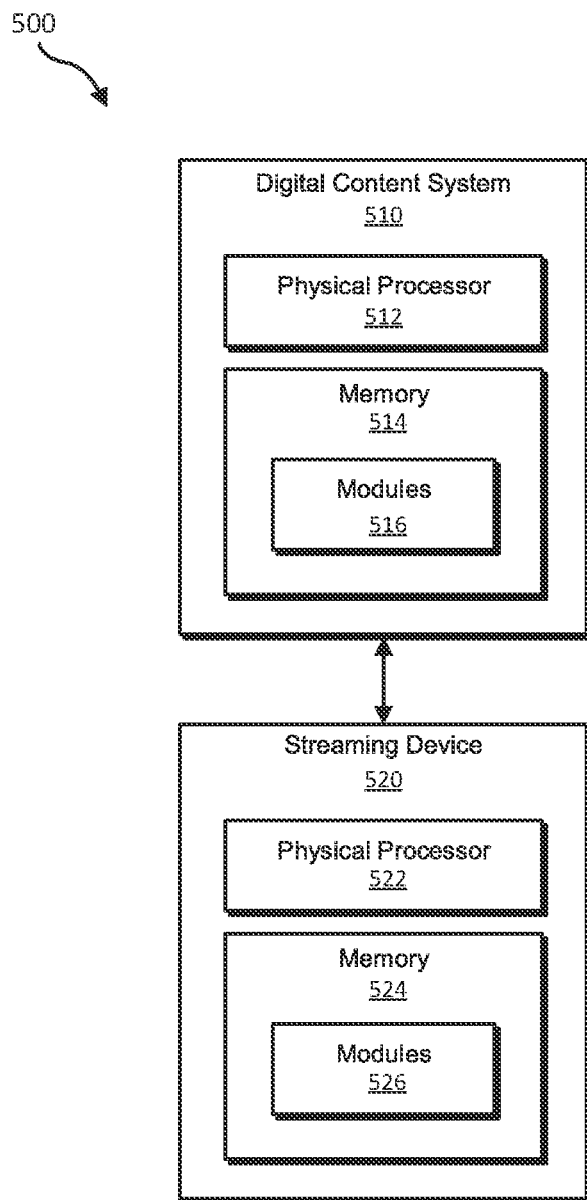
FIG. 5 is a block diagram of an exemplary content distribution ecosystem.
Figure 6:
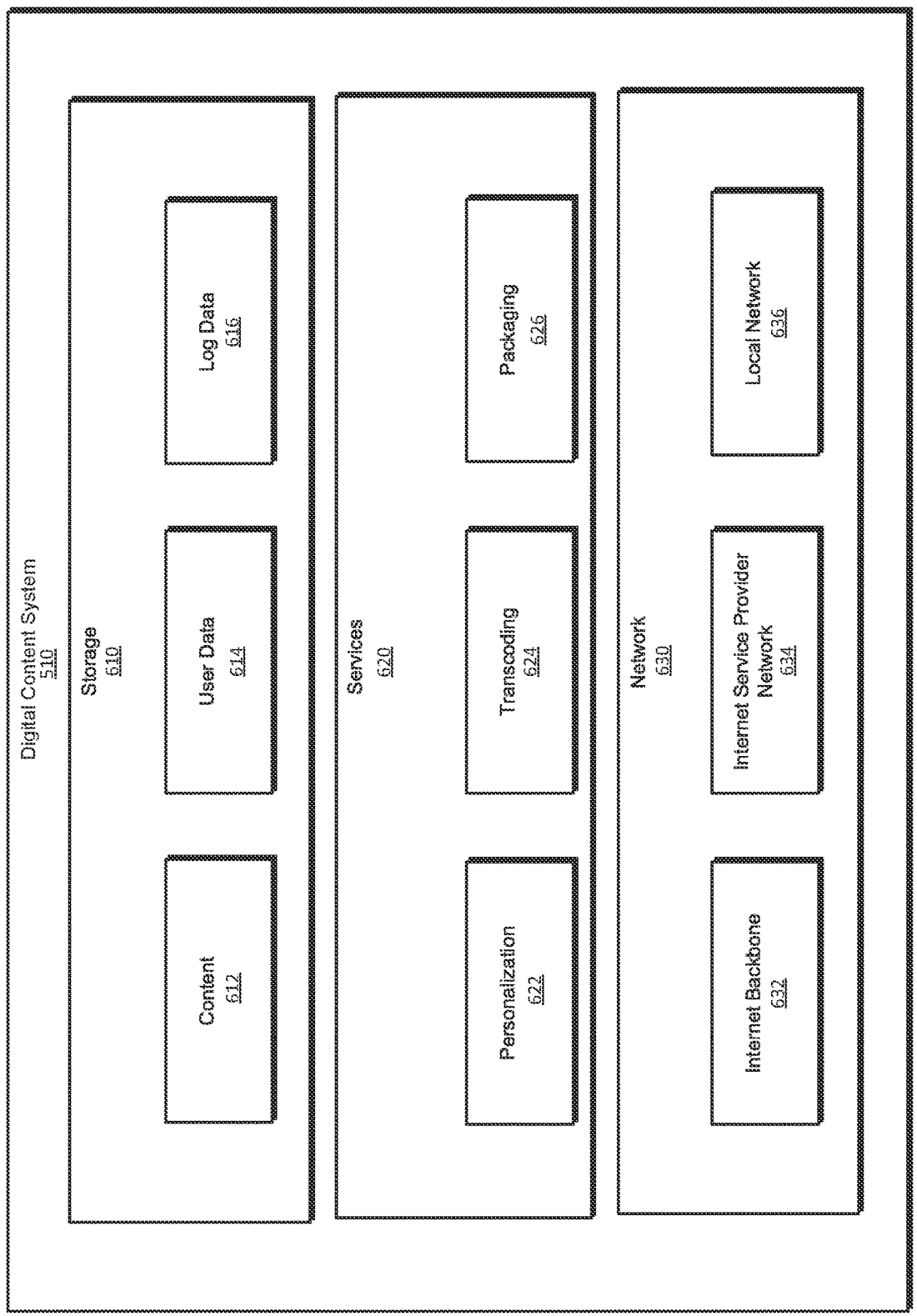
FIG. 6 is a block diagram of an exemplary distribution infrastructure within the content distribution ecosystem shown in FIG. 5.
Figure 7:
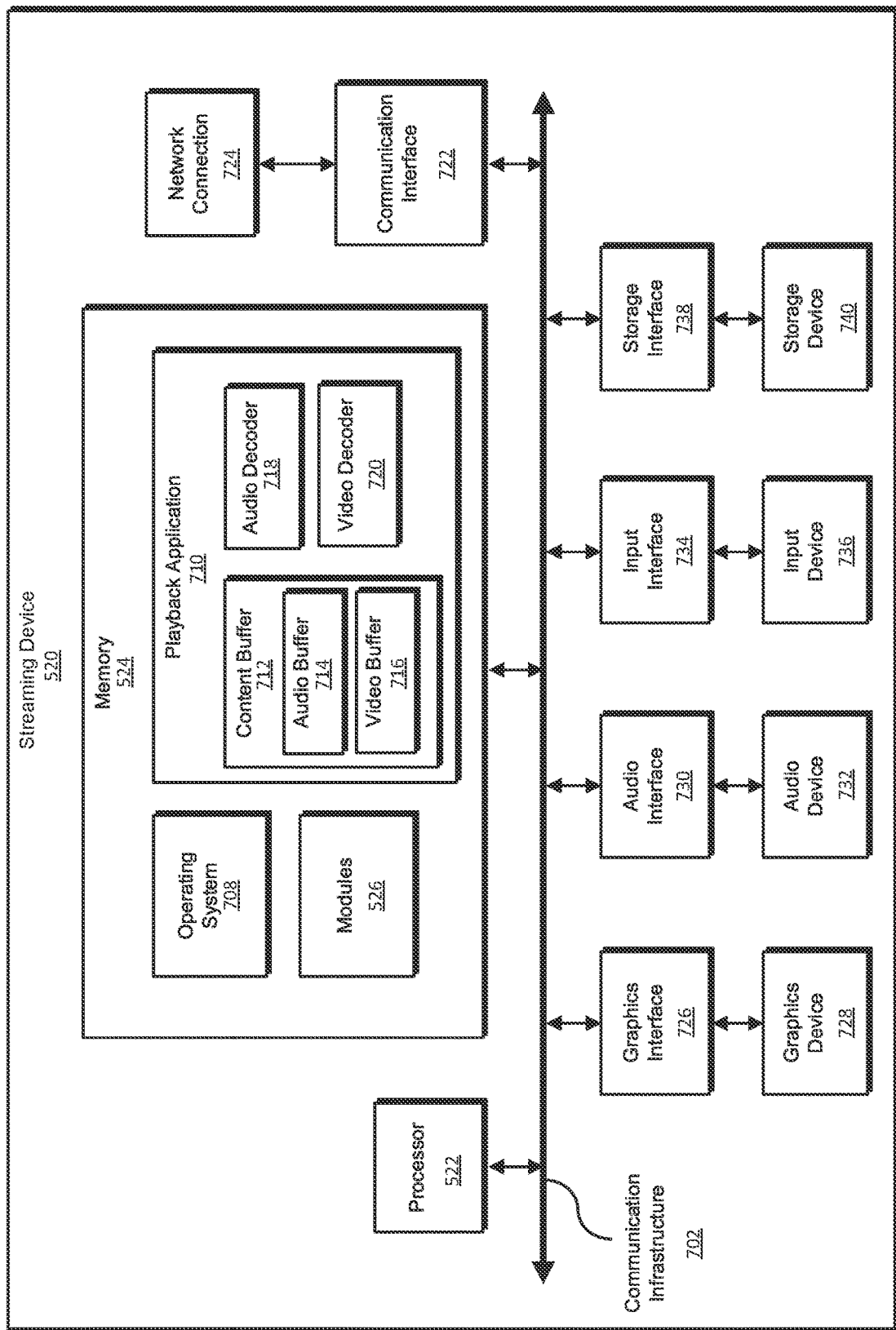
FIG. 7 is a block diagram of an exemplary content player within the content distribution ecosystem shown in FIG. 6.

The following will provide, with reference to FIGS. 1-7, detailed descriptions of a targeted content system that splices customized targeted content items into a live stream of a real-time event even though the targeted content breaks in the live stream are unknown. For example, an exemplary network environment is illustrated in FIG. 1 to show the targeted content system operating on either or both of a content delivery server and one or more client computing devices. FIG. 2 illustrates steps taken by the targeted content system in splicing targeted content into a live stream of a real-time event. FIG. 3A illustrates a sequence of steps that occur during a handshake protocol between a client media player on a client computing device and a digital content system on a content delivery server. FIGS. 3B-3E illustrate the targeted content system splicing targeted content into a live stream in different ways. Additionally, FIG. 4 provides additional detail with regard to the features and functionality of the targeted content system. FIGS. 5, 6, and 7 illustrate exemplary ecosystems and infrastructures that can be used in connection with the targeted content system.

As just mentioned, FIG. 1 illustrates an exemplary networking environment 100 implementing aspects of the present disclosure. For example, the networking environment 100 includes a content delivery server(s) 112, client computing devices 114a-114n, and a network 118. As further shown, the content delivery server(s) 112 includes a memory 120 while the client computing devices 114a-114n each include memories 106a-106n. Furthermore, the content delivery server(s) 112 includes additional items 122 while the client computing devices 114a-114n each include additional items 108a-108n. The content delivery server(s) 112 also includes a physical processor 124 while the client computing devices 114a-114n each include physical processors 110a-110n.

In one or more implementations, as shown in FIG. 1, the client computing devices 114a-114n may be display screen devices such as smartphones, tablets, smart TVs, laptops, smart wearables (e.g., head mounted displays), etc. In at least one implementation, the client computing devices 114a-114n access the Internet (e.g., wirelessly or non-wirelessly) to receive and transmit data in real-time. Additionally, in one or more implementations, the content delivery server(s) 112 make up or are part of a content delivery network including any number of auxiliary services.

As further shown in FIG. 1, a targeted content system 102 is implemented as part of one or more of the client computing devices 114a-114n in connection with the client media players 116a-116n. Moreover, the targeted content system 102 is additionally or alternatively implemented by the content delivery server(s) 112 as part of the digital content system 104. In one or more implementations, the digital content system 104 includes a streaming service for providing digital media content viewers. For example, the digital content system 104 receives and/or generates media data representing pre-recorded media content (e.g., TV shows, movies) and live media content (i.e., content that is being captured and transmitted as a live stream for playback in real time).

In one or more implementations, the targeted content system 102 operates as a component of the digital content system 104 to facilitate insertion of targeted content in live streams of events in real time. For example, when operating as part of the digital content system 104, the targeted content system 102 engages in initial handshake protocols with client computing devices and generates targeted content manifests and targeted content recommendation information for transmission to the client media players 116a-116n. When operating in connection with the client media players 116a-116n on the client computing devices 114a-114n, the targeted content system 102 requests specific targeted content, generates computing models of targeted content recommendations, detects signals and markers associated with targeted content insertion points in a live stream, and splices recommended targeted content into the live stream.

As further shown in FIG. 1, the client computing devices 114a-114n includes the client media players 116a-116n. In one or more implementations, the client media players 116a-116n communicate information to and from the digital content system 104 via the network 118. In response to receiving media content responses from the digital content system 104 and/or the targeted content system 102, the client media players 116a-116n decodes and renders digital media content (e.g., pre-recorded or live) into audio/visual displays for playback to users of the client computing devices 114a-114n. In some implementations, the client media players 116a-116n further generate audio/visual displays that include timed text such as closed captioning. In at least one implementation, the targeted content system 102 on the client computing devices 114a-114n inserts recommended targeted content into a live stream being played by the client media players 116a-116n.

As mentioned above, the client computing devices 114a-114n are communicatively coupled with the content delivery server(s) 112 through the network 118. In one or more implementations, the network 118 represents any type or form of communication network, such as the Internet, and includes one or more physical connections, such as a LAN, and/or wireless connections, such as a WAN. In some implementations, the network 118 represents a telecommunications carrier network. In at least one implementation, the network 118 represents combinations of networks such that the client computing device 114a may communicate with the digital content system 104 via a wireless network while the client computing device 114n may communicate with the digital content system 104 via a cellular network.

Although FIG. 1 illustrates components of the exemplary networking environment 100 in one arrangement, other arrangements are possible. For example, in one implementation, the targeted content system 102 may operate across multiple content delivery servers or content delivery nodes. Similarly, in some examples, components described in connection with the content delivery server(s) 112 are distributed across multiple physical devices. Moreover, in some implementations, the targeted content system 102 operates on the client computing devices 114a-114n as a component of the client media players 116a-116n-rather than in connection with the client media players 116a-116n. In one or more implementations, the targeted content system 102 operates only on the client computing devices 114a-114n. In additional implementations, the targeted content system operates only on the content delivery server(s) 112.

In one or more implementations, and as will be explained in greater detail below, the methods and steps performed by the targeted content system 102 reference multiple terms. For example, in one or more implementations, "targeted content" or "targeted content items" includes digital media that is provided for viewing to satisfy various conditions. To illustrate, in one example, targeted content includes a paid advertisement that is provided to a viewer to satisfy an agreement between the targeted content owner and the digital content system 104. In additional implementations, targeted content includes an interactive survey, an interactive voting feature, informational content, etc.

As used herein, a "communication channel" refers to a transmission path between two or more networked devices. In one or more implementations, a communication channel offers two-way communication such that devices on either end of the channel may transmit and receive data. In at least one implementation, the communication channel is secure or encoded such that data transmitted and received along the channel may not be intercepted.

As used herein, a "computing model" refers to any type of computer-based mechanism for making decisions. In one or more implementations, a computing model includes one or more of a neural network, a machine learning model, a decision tree, a listing of heuristics, etc. Additionally, "content recommendation information" refers to information used in generating a computing model of targeted content recommendations. In one or more examples, content recommendation information includes targeted content agreement information between targeted content owners and the digital content system 104, viewer information for use in customizing targeted content selections to viewer preferences, and geographic information indicating locations of client media players (e.g., for use in determining whether a location of a client media player satisfies one or more targeted content conditions). Additionally, a "manifest of targeted content items" refers to a list of targeted content items that are selected because they satisfy or correspond to some subset of the content recommendation information.

As used herein, a "live stream" refers to a stream of media data that is transmitted and received in real-time. In one or more implementations, a live stream includes one or more "live broadcast media segments" which each include a portion of the real-time media data. In at least one implementation, a live stream includes live broadcast media segments at a regular timed cadence (e.g., two seconds). In additional implementation, a live stream includes live broadcast media segments at an irregular timed cadence. A "playback position" refers to a position in the live stream that a client media player is currently rendering for playback.

As used herein, a "targeted content initialization marker" refers to the beginning of a targeted content break in a live stream. In one or more implementations, playback of a targeted content item begins at a targeted content initialization marker. Similarly, a "targeted content end marker" refers to the end of a targeted content break in a live stream. In one or more implementations, a computing model of targeted content recommendations generates a targeted content recommendation based at least in part on the length of a targeted content break as dictated by the targeted content initialization marker and the targeted content end marker for that break. It follows that an "early termination marker" refers to an unexpected end of a targeted content break. In some examples, an early termination marker is inserted into a live stream once playback of a targeted content item has already begun. In some implementations, initialization and end markers may exist "in-band" within a live stream, as discussed above. In additional implementations, such markers may be general indications of points within a live stream. For example, a different communication channel may provide timestamps corresponding to insertion points within the live stream.

As used herein, a "targeted content insertion signal" refers to a data transmission that is inserted into a live stream (e.g., as part of a header of a live broadcast media segment) to inform a client media player of an impending targeted content break. In one or more implementations, a targeted content insertion signal is formatted according to one or more protocols such as SCTE-35. Similarly, a "targeted content early termination signal" refers to a data transmission that is inserted into a live stream to inform a client media player that a targeted content break is being terminated early.

As used herein, an "initial length of targeted content" refers to data transmitted in connection with a targeted content item. In some examples, an initial length of targeted content includes metadata about a targeted content item (e.g., that allows the client media player 116a to retrieve media data and/or instructs the client media player 116a how to retrieve the media data). In some examples, an initial length of targeted content includes actual media data. In at least one example, the targeted content system 102 on the client computing device 114a receives targeted content item metadata as the initial length of targeted content. Following this, the targeted content system 102 continues to receive media data for the targeted content item incrementally (e.g., according to a streaming algorithm). In one example, the targeted content system 102 requests the first few seconds of a media content item initially and continues to request the remainder of the media content item once a targeted content break is determined.

As used herein, "blacked-out live broadcast media segment" refers to any type of media segment that includes no media content but can carry a targeted content end marker. In most implementations, a blacked-out live broadcast media segment is viewed as a blank or black screen when rendered by a client media player. Alternatively, in one example, a targeted content end marker is delivered by a different communication channel outside of a live stream. In that example, the targeted content system 102 does not deliver live broadcast media segments for that time period at all.

As mentioned above, FIG. 2 is a flow diagram of an exemplary computer-implemented method 200 for splicing recommended targeted content into a live stream of live broadcast media segments. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below. The steps shown in FIG. 2 may occur in a different order than what is shown. For example, two steps shown in succession may be executed substantially concurrently, or the steps may be executed in the reverse order, etc.

As illustrated in FIG. 2, at step 202 the targeted content system 102 as part of a client media player (e.g., the client media player 116a) generates a request for an initial length of targeted content according to a computing model of targeted content recommendations. For example, the targeted content system 102 generates the computing model based on content recommendation information that is specific to a user of the client computing device and the location of the client computing device. The targeted content system 102 generates the computing model to make incremental targeted content recommendations during the live stream where each targeted content recommendation is partially based on a previous targeted content recommendation.

As further illustrated in FIG. 2, at step 204 the targeted content system 102 transmits, along a communication channel between the client media player and a content delivery system (e.g., the digital content system 104), the request for the initial length of targeted content in combination with a request for a live stream of live broadcast media segments. For example, the client media player generates and transmits targeted content requests for portions or segments of recommended targeted content. In one or more implementations, the targeted content resides in a single place (e.g., server or service). In additional implementations, the targeted content resides on multiple servers.

In some implementations, as just described, the targeted content system 102 transmits the targeted content request in combination with the live stream request. In alternative implementations, the targeted content system 102 transmits the two requests separately. In that alternative implementation, for example, the targeted content system 102 on the content delivery server(s) 112 can generate a response to the live stream request that includes information about the earliest possible time for a targeted content break. As such, the targeted content system 102 on the client computing device 114a can make a targeted content request just before the indicated time. By making more timely targeted content requests, the targeted content system 102 may waste fewer computing resources in generating and transmitting wasted targeted content requests-such as when the viewer closes the client media player 116a before the targeted content break is reached.

As further illustrated in FIG. 2, at step 206 the targeted content system 102 receives, along the communication channel, the initial length of targeted content and the live stream of live broadcast media segments. In most examples, the targeted content system 102 receives the initial length of targeted content prior to detecting an insertion point (e.g., a targeted content initialization marker) in the live stream. Instead, the targeted content system 102 buffers the targeted content while playing one or more live broadcast media segments until the insertion point is detected. In at least one implementation, the targeted content system 102 only buffers a small amount of targeted content item content. This small amount may correspond to the amount needed to splice the targeted content item seamlessly into the live broadcast stream and retrieve an additional portion of the targeted content item before the buffered amount runs out.

As further illustrated in FIG. 2, at step 208 the targeted content system 102, in response to detecting a targeted content initialization marker at a current playback position of an additional broadcast media segment in the live stream, splices the initial length of targeted content into the live stream at the targeted content initialization marker. For example, in most implementations, the targeted content system 102 detects a targeted content insertion signal prior to detecting the targeted content initialization marker (e.g., the insertion point). Upon detecting the targeted content insertion signal, the targeted content system 102 loads the initial length of targeted content for playback. Then, upon detecting the targeted content initialization marker (e.g., marking the beginning of the insertion point, the targeted content system 102 begins playback of the targeted content by splicing the targeted content into the live stream at the targeted content initialization marker.

In one or more implementations, the targeted content system 102 engages in a handshake protocol prior to receiving a live stream of live broadcast media segments and other targeted content. In at least one implementation, the handshake protocol establishes a communication channel between the client computing device 114a and the digital content system 104. FIG. 3A illustrates a sequence of steps that occur during the handshake protocol between the targeted content system 102 as part of the client media player 116a on the client computing device 114a and the targeted content system 102 as part of the digital content system 104 as well as other systems. In some examples, the targeted content system 102 engages in the handshake protocol prior to the live stream beginning. In other examples, the targeted content system 102 engages in the handshake protocol after the live stream has already begun while the client media player 116a is "tuning in" to the live stream.

As shown in FIG. 3A, the targeted content system 102 in combination with the client media player 116a begins the handshake protocol by generating and transmitting a live stream request 302 to one or more playback services 304. In one or more implementations, the playback services 304 include a media metadata manager 306, a membership and plan manager 308, and a recommendation manager 310. In some examples, the media metadata manager 306 generates media metadata associated with the live broadcast content shown in the live stream. Additionally, in some examples, the membership and plan manager 308 makes determinations associated with live stream access. For example, the media metadata manager 306 and the membership and plan manager 308 work in concert to lookup a user tier associated with the user of the client computing device 114a and determine a need for targeted content insertion in the live stream.

In one or more implementations, the recommendation manager 310 receives these outputs from the media metadata manager 306 and the membership and plan manager 308 as well as additional information from a targeted content manager 312. For example, the recommendation manager 310 requests targeted content information from the targeted content manager 312 that is appropriate for the live stream, the user tier, etc. With this information, the recommendation manager 310 generates content recommendation information and the manifest of targeted content items 314. For example, the content recommendation information indicates an expected total time of targeted content that should be inserted into the live stream. The content recommendation information is also specific to the client computing device 114a and its user. Moreover, the manifest of targeted content items includes a listing of targeted content items that satisfy agreements between the digital content system 104 and one or more targeted content providers. In some examples, the list of targeted content items also corresponds to content recommendation information in that the indicated targeted content items are specific to a particular viewer or geographical region or area.

Upon receiving the content recommendation information and the manifest of targeted content items 314, the targeted content system 102—as part of the client media player 116a on the client computing device 114a-generates a computing model of targeted content recommendations (e.g., a "play graph"). In one or more implementations, the targeted content system 102 generates the computing model of targeted content including a model of decision points. For example, the computing model recommends targeted content items from the manifest of targeted content items to insert into the live stream based on a previously inserted targeted content item indicated by the most recent decision point. As mentioned above, the targeted content system 102 generates the computing model of recommendations such that agreements between the digital content system 104 and one or more targeted content owners are satisfied during the live broadcast event. Additionally, the targeted content system 102 generates the computing model of recommendations such that inserted targeted content items have a threshold level of variety in terms of content (e.g., by not recommending the same targeted content item twice in a row) and duration (e.g., a ninety second targeted content item may be recommended following a thirty second targeted content item). In some implementations, the targeted content system 102 further generates the computing model of recommendations such that targeted content items that are recommended from the manifest are customized to the user of the client computing device 114a (e.g., tailored to the user's interests, etc.).

Once the computing model of targeted content recommendations is generated, the client media player 116a begins requesting live broadcast media segments 316 from a content delivery network 318. In most examples, the client media player 116a requests both live broadcast media segments 316 of the live stream as well as media segments (e.g., an initial length) of the first targeted content item recommended by the computing model from the content delivery network 318. In some implementations, the content delivery network 318 includes a series of content nodes that store all or portions of targeted media content items. Additionally, the content delivery network 318 includes one or more servers (e.g., the content delivery server(s) 112) or nodes that broadcast media segments of the live stream in real time. As such, the content delivery network 318 returns targeted content items (e.g., either an initial portion of a targeted content item or the full targeted content item) and live broadcast media segments 320 back to the client media player 116a. At this point, the targeted content system 102 on the client media player 116a buffers the initial length of the targeted content item and begins playback of the live stream segments.

As mentioned above, the targeted content system 102 solves problems that arise in connection with providing targeted content during a live broadcast. For example, as shown in FIG. 3B, a live stream 322 often includes a period of live content 324. The period of live content 324 is generally of an unknown duration. To illustrate, if the live stream 322 includes live broadcast media segments of a sports game and a first targeted content break 326 is scheduled to occur "at the first time-out in the game," the first insertion point is unknown because there is no specific time associated with the first time-out. Moreover, once the first targeted content break 326 begins, its duration is also unknown. As further shown in FIG. 3B, the period of live content 328 that follows the first targeted content break 326 similarly has an unknown duration. Because of all the unknown durations and breaks in the live stream 322, conventional live broadcasting systems often experience "dead air" and abrupt cut-offs in connection with providing targeted content items in the live stream 322.

The targeted content system 102 solves these problems by generating a computing model of targeted content recommendations, pre-loading targeted content items, and splicing those targeted content items into a live stream based on signals and markers in the live stream. To further illustrate, FIG. 3C shows the live stream 322 of live broadcast media segments 330a, 330b, 330c, 330d, 330e, and 330f. In one or more implementations, the client media player 116a receives the live broadcast media segments 330a-330f at a regular timed cadence (e.g., two seconds).

As discussed above, the targeted content system 102 (e.g., as part of the client media player 116a) generates a computing model of targeted content recommendations during the initial handshake protocol. As soon as the computing model is generated, the targeted content system 102 further begins requesting and buffering targeted content items according to the recommendations issued by the computing model. As such, the targeted content system 102 already has at least an initial length of targeted content while playing the first live broadcast media segment 330a.

As further shown in FIG. 3C, the targeted content system 102 receives a targeted content insertion signal 332 as part of the live broadcast media segment 330b. In one or more implementations, the targeted content insertion signal 332 is a target content break payload (SCTE-35) that is injected into the live stream 322 to inform the client media player 116a that it is time for a targeted content item to be spliced into the live stream 322. At this point, the targeted content system 102 preloads an initial length of a targeted content item 338 from the buffer associated with the computing model of targeted content recommendations.

In response to detecting a targeted content initialization marker 334 in the live stream 322, the targeted content system 102 splices the targeted content item 338 into the live stream 322. For example, in one or more implementations, the targeted content initialization marker 334 indicates the insertion point when playback of the targeted content item 338 should begin. Because at least the initial portion of the targeted content item 338 was buffered and pre-loaded prior to the targeted content initialization marker 334, the targeted content system 102 ensures that the transition from the live broadcast media segment 330b to the targeted content item 338 is smooth and seamless.

In one or more implementations, the targeted content system 102 splices the targeted content item 338 into the live stream 322 by filling the live broadcast media segments that are received during playback of the targeted content item 338 (e.g., live broadcast media segments 330d-330e and portions of live broadcast media segments 330b and 330f) with black while the targeted content item 338 is displayed. As shown in FIG. 3C, the targeted content system 102 transitions back to playback of the live broadcast media segment 330f upon detecting a targeted content end marker 336.

In some implementations, the targeted content system 102 receives live broadcast media segments 330a-330f on a regular timed cadence. As such, the targeted content system 102 begins and ends playback of the targeted content item 338 at mid-way points in the live broadcast media segment 330b and live broadcast media segment 330f, respectively.

In some examples, and in order to accurately splice the continued content of the live stream 322 following the targeted content item 338, the targeted content system 102 encodes the live broadcast media segment 330f with a Random Access Point. In that example, an encoder associated with the live broadcast media segment 330f is provided with the targeted content end marker 336 to correctly encode the live broadcast media segment 330f. If the live broadcast media segment 330f is not encoded, the client media player 116a begins playback of the live stream 322 at the next live broadcast media segment following the targeted content item 338. In an alternative implementation, the targeted content system 102 resumes playback of the live stream 322 at the beginning of the live broadcast media segment 330f. If the targeted content system 102 resumes playback at the next live broadcast media segment following the targeted content item 338 (e.g., the live broadcast media segment following the live broadcast media segment 330f), some buffer time is "lost" (e.g., the difference between playback of the live broadcast event and the live event). In such an example, the client media player 116a may adjust by playing the live stream 322 at a slightly slower speed for a short while or may adjust the buffer to a lower level. Thus, If playback of the live stream 322 begins again at the live broadcast media segment, the viewer will see two seconds of black. A short period of black at the end of a targeted content break may lead to a desirable user experience to mark the transition from targeted content back to the live stream 322. Otherwise, this transition can feel jarring to the viewer.

In some implementations, the determination as to when to resume playback of the live stream 322 following the targeted content item 338 (e.g., at the beginning of the live broadcast media segment 330f or the next broadcast media segment following the live broadcast media segment 330f) is made dynamically based on, for example, how far into live broadcast media segment 330f the targeted content end marker 336 is (i.e. how much black the viewer would see) and how much buffer the client media player 116a has. In one example, if the determination is made to resume playback of the live stream 322 at the next broadcast media segment following the live broadcast media segment 330f, the targeted content system 102 may insert a short period of black to smooth the transition and avoid giving up buffer time.

In an additional implementation, the targeted content system 102 splices the targeted content item 338 into the live stream 322 according to the targeted content initialization marker 334 and the targeted content end marker 336 in a way that generates different segment cadences and durations. To illustrate, FIG. 3D shows the targeted content system 102 receiving the live broadcast media segment 330a at a regular cadence (e.g., two seconds) until detecting the targeted content insertion signal 332. Upon detecting the targeted content initialization marker 334, the targeted content system 102 shortens the duration of the live broadcast media segment 330b (e.g., to 1.6 seconds) and begins playback of the targeted content item 338. Similarly, upon detecting the targeted content end marker 336, the targeted content system 102 shortens the duration of the blacked-out live broadcast media segment 330f (e.g., to one second) and restarts the regular cadence with the live broadcast media segment 330g.

As discussed above, FIG. 3C demonstrates how the targeted content system 102 inserts targeted content items into the live stream 322 including a fixed cadence of live broadcast media segments. Additionally, FIG. 3O demonstrates how the targeted content system 102 inserts targeted content items into the live stream 322 including an irregular cadence of live broadcast media segments. In yet another implementation, the targeted content system 102 maintains a regular cadence of live broadcast media segments in the live stream 322 (e.g., two second segments), but also allows some of the live broadcast media segments to be split into sub-parts. For example, the targeted content system 102 can allow the live broadcast media segment 330b to be two seconds long, but then splits the live broadcast media segment 330b into 330b (1) and 330b (2) (e.g., with 330b (1) being 1.6 seconds and 330b (2) being 0.4 seconds). Similarly, in that implementation, the targeted content system would split the live broadcast media segment 330f into 330f (1) and 330f (2); both with lengths of one second. In this way, the targeted content system 102 performs perfectly timed slicing but the high level mapping from time to live broadcast media segment number is maintained. When the client media player 116a downloads the first part of a "split" segment, the segment contains an indication that there is a second sub-part. Alternatively, the client media player 116a makes the same determination automatically based on the first sub. part having a length less than two seconds.

In addition to providing smooth transitions to targeted content in the live stream 322, the targeted content system 102 also enables for the transition back to the live stream 322 when a targeted content break is cut short. For example, when the targeted content break is during half-time of a sporting event, the targeted content break may be cut short when the sporting event resumes faster than expected after the half-time.

To illustrate, FIG. 3E shows the live stream 322 received by the client media player 116a including live broadcast media segments 330a-330g. As further shown, the targeted content system 102 splices the targeted content item 338 into the live stream 322 according to the targeted content insertion signal 332 and the targeted content initialization marker 334. At some point during playback of the targeted content item 338, the targeted content system 102 detects a targeted content early termination signal 340 in the live stream 322. In one or more implementations, the targeted content initialization marker 334 is included in the live broadcast media segment 330e. The targeted content system 102 then terminates playback of the targeted content item 338 upon detecting an early termination marker 342, leaving a portion of the targeted content item 338 not played. In one or more implementations, the targeted content system 102 switches back to the live stream 322 by ignoring the black-out from the live broadcast media segment 330f and displaying the normal content of the live broadcast media segment 330f.

In another implementation, the targeted content system 102 continues to render the targeted content item, but intelligently determines at what point in the targeted content item to stop. In one example, if playback is near the end of the targeted content item, the targeted content system 102 continues playback to the end of the targeted content item. The targeted content system 102 would then splice to the same point in the live stream 322 (e.g., the targeted content end marker 336). The consequence of this-compared to the implementation discussed in connection with FIG. 3E—is that playback falls behind the live edge of the live stream 322 slightly. The targeted content system 102 can recover the additional delay by accelerating the playback speed slightly for a short while.

As mentioned above, and as shown in FIG. 4, the targeted content system 102 performs various functions in connection with splicing targeted content into a live stream of a live broadcast event. FIG. 4 is a block diagram 400 of the targeted content system 102 operating within the memory 106a of the client computing device 114a and within the memory 120 of the content delivery server(s) 112 while performing these functions. As such, FIG. 4 provides additional detail with regard to these functions. For example, as shown in FIG. 4, the targeted content system 102 on the client computing device 114a includes a computing model manager 402 and an insertion manager 404. On the content delivery server(s) 112, the targeted content system 102 includes a communication manager 406 and a targeted content manager 408.

In certain implementations, the targeted content system 102 (on either the content delivery server(s) 112 or the client computing device 114a or both) may represent one or more software applications, modules, or programs that, when executed by a computing device, may cause the computing device to perform one or more tasks. For example, and as will be described in greater detail below, one or more of the computing model manager 402, the insertion manager 404, the communication manager 406, and/or the targeted content manager 408 may represent software stored and configured to run on one or more computing devices, such as the content delivery server(s) 112 and/or the client computing device 114a. One or more of the computing model manager 402, the insertion manager 404, the communication manager 406, and the targeted content manager 408 of the targeted content system 102 shown in FIG. 4 may also represent all or portions of one or more special purpose computers to perform one or more tasks.

As mentioned above, and as shown in FIG. 4, the targeted content system 102 on the client computing device 114a includes the computing model manager 402. In one or more implementations, the computing model manager 402 generates a computing model of targeted content recommendations, as discussed above. Moreover, the computing model manager 402 applies the computing model of targeted content recommendations during playback of a live stream. For example, the computing model manager 402 applies the computing model to identify a next targeted content item to request from the digital content system 104 and/or other content delivery network 318. In at least one implementation, the computing model manager 402 requests and buffers at least an initial portion of a targeted content item prior to detecting a targeted content insertion signal.

As mentioned above, and as shown in FIG. 4, the targeted content system 102 on the client computing device 114a includes the insertion manager 404. In one or more implementations, the insertion manager 404 detects signals and markers in a live stream. For example, in response to detecting a targeted content insertion signal, the insertion manager 404 loads at least an initial portion of a targeted content item that was previously buffered by the computing model manager 402. In response to detecting a targeted content initialization marker at a current playback position of the live stream, the insertion manager 404 splices the targeted content item into the live stream. In at least one implementation, the insertion manager 404 splices the targeted content item by blacking out the live broadcast media segments that occur in the live stream during playback of the targeted content item.

As mentioned above, and as shown in FIG. 4, the targeted content system 102 on the content delivery server(s) 112 includes the communication manager 406. In one or more implementations, the communication manager 406 inserts markers and signals into a live stream of live broadcast media segments. For example, the communication manager 406 generates and transmits a targeted content insertion signal in a live stream to inform a client media player of an impending insertion point. Similarly, the communication manager 406 generates and transmits a targeted content early termination signal in the live stream to inform the client media player that a targeted content break has been cut short. Moreover, the communication manager 406 generates and transmits initialization, termination, and end markers in the live stream to communicate the start and end of targeted content breaks.

As mentioned above, and as shown in FIG. 4, the targeted content system 102 on the content delivery server(s) 112 includes the targeted content manager 408. In one or more implementations, the targeted content manager 408 generates targeted content recommendation information and manifests of targeted content items. As discussed above, the targeted content manager 408 generates and transmits the targeted content recommendation information and manifests of targeted content items for use in generating computing models of targeted content recommendations by client media players.

As shown in FIGS. 1 and 4, the client computing devices 114a-114n and the content delivery server(s) 112 include one or more physical processors, such as the physical processors 110a-110n and 124, respectively. The physical processors 110a-110n and 124 generally represent any type or form of hardware-implemented processing unit capable of interpreting and/or executing computer-readable instructions. In one implementation, the physical processors 110a-110n and 124 access and/or modify one or more of the components of the targeted content system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the client computing devices 114a-114n and content delivery server(s) 112 include the memories 106a-106n and 120, respectively. In one or more implementations, the memories 106a-106n and 120 generally represent any type or form of volatile or non-volatile storage device or medium capable of storing data and/or computer-readable instructions. In one example, the memories 106a-106n and 120 may store, load, and/or maintain one or more of the components of the targeted content system 102. Examples of the memories 106a-106n and 120 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the client computing devices 114a-114n and the content delivery server(s) 112 include the additional items 108a-108n and 122, respectively. On the client computing device 114a, the additional items 108a-108n include computing models of targeted content recommendations, manifests of targeted content items, and buffered portions of targeted content items. On the content delivery server(s) 112, the additional items 122 includes recommendation information associated with users and client media players, targeted content items and information, and metadata associated with live streams.

In summary, the targeted content system 102 inserts targeted content items into a live stream, even when targeted content breaks happen unexpectedly and have unknown durations. As discussed above, the targeted content system 102 utilizes signals and markers that are communicated in the same communication channel as the live stream to identify a targeted content break and splice a targeted content item into that break. To enable fast targeted content selections and transitions, the targeted content system 102 generates computing models of targeted content recommendations that are tailored to pre-existing targeted content agreements, targeted content break durations, viewers of the targeted content items, and locations of client media players where playback of the targeted content items occurs. In this way, the targeted content system 102 provides targeted content during live streams of real-time events in a way that avoids "dead-air" and jagged transitions.

The following will provide, with reference to FIG. 5, detailed descriptions of exemplary ecosystems in which content is provisioned to end nodes and in which requests for content are steered to specific end nodes. The discussion corresponding to FIGS. 6 and 7 presents an overview of an exemplary distribution infrastructure and an exemplary content player used during playback sessions, respectively. These exemplary ecosystems and distribution infrastructures are implemented in any of the embodiments described above with reference to FIGS. 1-4.

FIG. 5 is a block diagram of a content distribution ecosystem 500 that includes a distribution infrastructure 510 in communication with a content player 520. In some embodiments, distribution infrastructure 510 is configured to encode data at a specific data rate and to transfer the encoded data to content player 520. Content player 520 is configured to receive the encoded data via distribution infrastructure 510 and to decode the data for playback to a user. The data provided by distribution infrastructure 510 includes, for example, audio, video, text, images, animations, interactive content, haptic data, virtual or augmented reality data, location data, gaming data, or any other type of data that is provided via streaming.

Distribution infrastructure 510 generally represents any services, hardware, software, or other infrastructure components configured to deliver content to end users. For example, distribution infrastructure 510 includes content aggregation systems, media transcoding and packaging services, network components, and/or a variety of other types of hardware and software. In some cases, distribution infrastructure 510 is implemented as a highly complex distribution system, a single media server or device, or anything in between. In some examples, regardless of size or complexity, distribution infrastructure 510 includes at least one physical processor 512 and memory 514. One or more modules 516 are stored or loaded into memory 514 to enable adaptive streaming, as discussed herein.

Content player 520 generally represents any type or form of device or system capable of playing audio and/or video content that has been provided over distribution infrastructure 510. Examples of content player 520 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 510, content player 520 includes a physical processor 522, memory 524, and one or more modules 526. Some or all of the adaptive streaming processes described herein is performed or enabled by modules 526, and in some examples, modules 516 of distribution infrastructure 510 coordinate with modules 526 of content player 520 to provide adaptive streaming of digital content.

In certain embodiments, one or more of modules 516 and/or 526 in FIG. 5 represent one or more software applications or programs that, when executed by a computing device, cause the computing device to perform one or more tasks. For example, and as will be described in greater detail below, one or more of modules 516 and 526 represent modules stored and configured to run on one or more general-purpose computing devices. One or more of modules 516 and 526 in FIG. 5 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 512 and 522 generally represent any type or form of hardware-implemented processing unit capable of interpreting and/or executing computer-readable instructions. In one example, physical processors 512 and 522 access and/or modify one or more of modules 516 and 526, respectively. Additionally or alternatively, physical processors 512 and 522 execute one or more of modules 516 and 526 to facilitate adaptive streaming of digital content. Examples of physical processors 512 and 522 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 514 and 524 generally represent any type or form of volatile or non-volatile storage device or medium capable of storing data and/or computer-readable instructions. In one example, memory 514 and/or 524 stores, loads, and/or maintains one or more of modules 516 and 526. Examples of memory 514 and/or 524 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 6 is a block diagram of exemplary components of distribution infrastructure 510 according to certain embodiments. Distribution infrastructure 510 includes storage 610, services 620, and a network 630. Storage 610 generally represents any device, set of devices, and/or systems capable of storing content for delivery to end users. Storage 610 includes a central repository with devices capable of storing terabytes or petabytes of data and/or includes distributed storage systems (e.g., appliances that mirror or cache content at Internet interconnect locations to provide faster access to the mirrored content within certain regions). Storage 610 is also configured in any other suitable manner.

As shown, storage 610 may store a variety of different items including content 612, user data 614, and/or log data 616. Content 612 includes television shows, movies, video games, user-generated content, and/or any other suitable type or form of content. User data 614 includes personally identifiable information (PII), payment information, preference settings, language and accessibility settings, and/or any other information associated with a particular user or content player. Log data 616 includes viewing history information, network throughput information, and/or any other metrics associated with a user's connection to or interactions with distribution infrastructure 510.

Services 620 includes personalization services 622, transcoding services 624, and/or packaging services 626. Personalization services 622 personalize recommendations, content streams, and/or other aspects of a user's experience with distribution infrastructure 510. Transcoding services 624 compress media at different bitrates which, as described in greater detail below, enable real-time switching between different encodings. Packaging services 626 package encoded video before deploying it to a delivery network, such as network 630, for streaming.

Network 630 generally represents any medium or architecture capable of facilitating communication or data transfer. Network 630 facilitates communication or data transfer using wireless and/or wired connections. Examples of network 630 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 6, network 630 includes an Internet backbone 632, an internet service provider network 634, and/or a local network 636. As discussed in greater detail below, bandwidth limitations and bottlenecks within one or more of these network segments triggers video and/or audio bit rate adjustments.

FIG. 7 is a block diagram of an exemplary implementation of content player 520 of FIG. 5. Content player 520 generally represents any type or form of computing device capable of reading computer-executable instructions. Content player 520 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 7, in addition to processor 522 and memory 524, content player 520 includes a communication infrastructure 702 and a communication interface 722 coupled to a network connection 724. Content player 520 also includes a graphics interface 726 coupled to a graphics device 728, an audio interface 730 coupled to an audio device 732, an input interface 734 coupled to an input device 736, and a storage interface 738 coupled to a storage device 740.

Communication infrastructure 702 generally represents any type or form of infrastructure capable of facilitating communication between one or more components of a computing device. Examples of communication infrastructure 702 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 524 generally represents any type or form of volatile or non-volatile storage device or medium capable of storing data and/or other computer-readable instructions. In some examples, memory 524 stores and/or loads an operating system 708 for execution by processor 522. In one example, operating system 708 includes and/or represents software that manages computer hardware and software resources and/or provides common services to computer programs and/or applications on content player 520.

Operating system 708 performs various system management functions, such as managing hardware components (e.g., graphics interface 726, audio interface 730, input interface 734, and/or storage interface 738). Operating system 708 also provides process and memory management models for playback application 710. The modules of playback application 710 includes, for example, a content buffer 712, an audio decoder 718, and a video decoder 720.

Playback application 710 is configured to retrieve digital content via communication interface 722 and play the digital content through graphics interface 726 and audio interface 730. Graphics interface 726 is configured to transmit a rendered video signal to graphics device 728. Audio interface 730 is configured to transmit a rendered audio signal to audio device 732. In normal operation, playback application 710 receives a request from a user to play a specific title or specific content. Playback application 710 then identifies one or more encoded video and audio streams associated with the requested title.

In one embodiment, playback application 710 begins downloading the content associated with the requested title by downloading sequence data encoded to the lowest audio and/or video playback bitrates to minimize startup time for playback. The requested digital content file is then downloaded into content buffer 712, which is configured to serve as a first-in, first-out queue. In one embodiment, each unit of downloaded data includes a unit of video data or a unit of audio data. As units of video data associated with the requested digital content file are downloaded to the content player 520, the units of video data are pushed into the content buffer 712. Similarly, as units of audio data associated with the requested digital content file are downloaded to the content player 520, the units of audio data are pushed into the content buffer 712. In one embodiment, the units of video data are stored in video buffer 716 within content buffer 712 and the units of audio data are stored in audio buffer 714 of content buffer 712.

A video decoder 720 reads units of video data from video buffer 716 and outputs the units of video data in a sequence of video frames corresponding in duration to the fixed span of playback time. Reading a unit of video data from video buffer 716 effectively de-queues the unit of video data from video buffer 716. The sequence of video frames is then rendered by graphics interface 726 and transmitted to graphics device 728 to be displayed to a user.

An audio decoder 718 reads units of audio data from audio buffer 714 and outputs the units of audio data as a sequence of audio samples, generally synchronized in time with a sequence of decoded video frames. In one embodiment, the sequence of audio samples is transmitted to audio interface 730, which converts the sequence of audio samples into an electrical audio signal. The electrical audio signal is then transmitted to a speaker of audio device 732, which, in response, generates an acoustic output.

In situations where the bandwidth of distribution infrastructure 510 is limited and/or variable, playback application 710 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 726 is configured to generate frames of video data and transmit the frames of video data to graphics device 728. In one embodiment, graphics interface 726 is included as part of an integrated circuit, along with processor 522. Alternatively, graphics interface 726 is configured as a hardware accelerator that is distinct from (i.e., is not integrated within) a chipset that includes processor 522.

Graphics interface 726 generally represents any type or form of device configured to forward images for display on graphics device 728. For example, graphics device 728 is fabricated using liquid crystal display (LCD) technology, cathode-ray technology, and light-emitting diode (LED) display technology (either organic or inorganic). In some embodiments, graphics device 728 also includes a virtual reality display and/or an augmented reality display. Graphics device 728 includes any technically feasible means for generating an image for display. In other words, graphics device 728 generally represents any type or form of device capable of visually displaying information forwarded by graphics interface 726.

As illustrated in FIG. 7, content player 520 also includes at least one input device 736 coupled to communication infrastructure 702 via input interface 734. Input device 736 generally represents any type or form of computing device capable of providing input, either computer or human generated, to content player 520. Examples of input device 736 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 520 also includes a storage device 740 coupled to communication infrastructure 702 via a storage interface 738. Storage device 740 generally represents any type or form of storage device or medium capable of storing data and/or other computer-readable instructions. For example, storage device 740 is a magnetic disk drive, a solid-state drive, an optical disk drive, a flash drive, or the like. Storage interface 738 generally represents any type or form of interface or device for transferring data between storage device 740 and other components of content player 520.

EXAMPLE EMBODIMENTS

Example 1: A computer-implemented method for splicing targeted content into a live stream of a real-time broadcast. For example, the method may include generating, by a client media player, a request for an initial length of targeted content according to a computing model of targeted content recommendations, transmitting, along a communication channel between the client media player and a content delivery system, the request for the initial length of targeted content in combination with a request for a live stream of live broadcast media segments, receiving, along the dedicated communication channel, the initial length of targeted content and the live stream of live broadcast media segments, and in response to detecting a targeted content initialization marker at a current playback position of an additional broadcast media segment in the live stream, splicing the initial length of targeted content into the live stream at the targeted content initialization marker.

Example 2: The computer-implemented method of Example 1, further including generating the computing model of targeted content recommendations by receiving, from a digital content system, content recommendation information that is specific to one or more of a user of the client media player or a location of the client media player, receiving, from the digital content system, a manifest of targeted content items corresponding to the content recommendation information, and generating the computing model of targeted content recommendations based on the content recommendation information and the manifest of targeted content items.

Example 3: The computer-implemented method of any of Examples 1 and 2, further including, in response to receiving the initial length of targeted content, buffering the initial length of targeted content until the targeted content initialization marker is detected in the live stream.

Example 4: The computer-implemented method of any of Examples 1-3, further including detecting a targeted content insertion signal in the live stream prior to detecting the targeted content initialization marker and loading the initial length of targeted content for splicing into the live stream at the targeted content initialization marker.

Example 5: The computer-implemented method of any of Examples 1-4, wherein generating the one or more client media player instructions tailored to the live event includes generating one or more client media player instructions to modify one or more characteristics of a seek bar presented by the client media player in association with the live media broadcast.

Example 6: The computer-implemented method of any of Examples 1-5, wherein the live stream includes one or more live broadcast media segments that are played at a regular timed cadence.

Example 7: The computer-implemented method of any of Examples 1-6, further including inserting blacked-out live broadcast media segments into the live stream until detecting a targeted content end marker.

Example 8: The computer-implemented method of any of Examples 1-7, further including detecting the targeted content end marker in the live stream and resuming playback of the live broadcast media segments in the live stream.

Example 9: The computer-implemented method of any of Examples 1-8, further including detecting a targeted content early termination signal prior to detecting the targeted content end marker in the live stream and, upon detecting an early termination marker corresponding to the targeted content early termination signal, stopping targeted content playback, ignoring blacked-out media segments from the live stream, and resuming playback of the live broadcast media segments in the live stream.

In some examples, a system may include at least one processor and a physical memory including computer-executable instructions that, when executed by the at least one processor, cause the at least one processor to perform various acts. For example, the computer-executable instructions may cause the at least one processor to perform acts including generating a request for an initial length of targeted content according to a computing model of targeted content recommendations, transmitting, along a communication channel between the client media player and a content delivery system, the request for the initial length of targeted content in combination with a request for a live stream of live broadcast media segments, receiving, along the communication channel, the initial length of targeted content and the live stream of live broadcast media segments, and in response to detecting a targeted content initialization marker at a current playback position of an additional broadcast media segment in the live stream, splicing the initial length of targeted content into the live stream at the targeted content initialization marker.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to generate a request for an initial length of targeted content according to a computing model of targeted content recommendations, transmitting, along a communication channel to a content delivery system, the request for the initial length of targeted content in combination with a request for a live stream of live broadcast media segments, receiving, along the communication channel, the initial length of targeted content and the live stream of live broadcast media segments, and in response to detecting a targeted content initialization marker at a current playback position of an additional broadcast media segment in the live stream, splicing the initial length of targeted content into the live stream at the targeted content initialization marker.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:
   generating, by a client media player, a request for an initial length of targeted content according to a computing model of targeted content recommendations;
   transmitting, along a communication channel between the client media player and a content delivery system, the request for the initial length of targeted content in combination with a request for a live stream of live broadcast media segments;
   receiving, along the communication channel, the initial length of targeted content and the live stream of live broadcast media segments; and in response to detecting a targeted content initialization marker at a current playback position of an additional broadcast media segment in the live stream, splicing the initial length of targeted content into the live stream at the targeted content initialization marker.

2. The computer-implemented method of claim 1, further comprising generating the computing model of targeted content recommendations by:
   receiving, from a digital content system, content recommendation information that is specific to one or more of a user of the client media player or a location of the client media player;
   receiving, from the digital content system, a manifest of targeted content items corresponding to the content recommendation information; and
   generating the computing model of targeted content recommendations based on the content recommendation information and the manifest of targeted content items.

3. The computer-implemented method of claim 1, further comprising, in response to receiving the initial length of targeted content, buffering the initial length of targeted content until the targeted content initialization marker is detected in the live stream.

4. The computer-implemented method of claim 1, further comprising:
   detecting a targeted content insertion signal in the live stream prior to detecting the targeted content initialization marker; and
   loading the initial length of targeted content for splicing into the live stream at the targeted content initialization marker.

5. The computer-implemented method of claim 1, wherein the live stream comprises one or more live broadcast media segments that are played at a regular timed cadence.

6. The computer-implemented method of claim 5, further comprising inserting blacked-out live broadcast media segments into the live stream until detecting a targeted content end marker.

7. The computer-implemented method of claim 6, further comprising:
   detecting the targeted content end marker in the live stream; and
   resuming playback of the live broadcast media segments in the live stream.

8. The computer-implemented method of claim 6, further comprising:
   detecting a targeted content early termination signal prior to detecting the targeted content end marker in the live stream; and
   upon detecting an early termination marker corresponding to the targeted content early termination signal:
     stopping targeted content playback;
     ignoring blacked-out media segments from the live stream; and
     resuming playback of the live broadcast media segments in the live stream.

9. A system comprising:
   at least one physical processor; and
   physical memory comprising computer-executable instructions that, when executed by the at least one physical processor, cause the at least one physical processor to perform acts comprising:
     generating a request for an initial length of targeted content according to a computing model of targeted content recommendations;
     transmitting, along a communication channel to a content delivery system, the request for the initial length of targeted content in combination with a request for a live stream of live broadcast media segments;
     receiving, along the communication channel, the initial length of targeted content and the live stream of live broadcast media segments; and
     in response to detecting a targeted content initialization marker at a current playback position of an additional broadcast media segment in the live stream, splicing the initial length of targeted content into the live stream at the targeted content initialization marker.

10. The system of claim 9, further comprising instructions that, when executed by the at least one physical processor, cause the at least one physical processor to perform an act comprising generating the computing model of targeted content recommendations by:
    receiving, from a digital content system, content recommendation information that is specific to one or more of a user of a client media player or a location of the client media player;
    receiving, from the digital content system, a manifest of targeted content items corresponding to the content recommendation information; and
    generating the computing model of targeted content recommendations based on the content recommendation information and the manifest of targeted content items.

11. The system of claim 9, further comprising instructions that, when executed by the at least one physical processor, cause the at least one physical processor to perform an act comprising, in response to receiving the initial length of targeted content, buffering the initial length of targeted content until the targeted content initialization marker is detected in the live stream.

12. The system of claim 9, further comprising instructions that, when executed by the at least one physical processor, cause the at least one physical processor to perform acts comprising:
    detecting a targeted content insertion signal in the live stream prior to detecting the targeted content initialization marker; and
    loading the initial length of targeted content for splicing into the live stream at the targeted content initialization marker.

13. The system of claim 9, wherein the live stream comprises one or more live broadcast media segments that are played at a regular timed cadence.

14. The system of claim 13, further comprising instructions that, when executed by the at least one physical processor, cause the at least one physical processor to perform an act comprising inserting blacked-out live broadcast media segments into the live stream until detecting a targeted content end marker.

15. The system of claim 14, further comprising instructions that, when executed by the at least one physical processor, cause the at least one physical processor to perform acts comprising:
    detecting the targeted content end marker in the live stream; and
    resuming playback of the live broadcast media segments in the live stream.

16. The system of claim 14, further comprising instructions that, when executed by the at least one physical processor, cause the at least one physical processor to perform acts comprising:

detecting a targeted content early termination signal prior to detecting the targeted content end marker in the live stream; and upon detecting an early termination marker corresponding to the targeted content early termination signal:
- stopping targeted content playback;
- ignoring blacked-out media segments from the live stream; and
- resuming playback of the live broadcast media segments in the live stream.

17. A non-transitory computer-readable medium comprising one or more computer-executable instructions that, when executed by at least one processor of a computing device, cause the computing device to:
- generate a request for an initial length of targeted content according to a computing model of targeted content recommendations;
- transmit, along a communication channel to a content delivery system, the request for the initial length of targeted content in combination with a request for a live stream of live broadcast media segments;
- receive, along the communication channel, the initial length of targeted content and the live stream of live broadcast media segments; and
- in response to detecting a targeted content initialization marker at a current playback position of an additional broadcast media segment in the live stream, splice the initial length of targeted content into the live stream at the targeted content initialization marker.

18. The non-transitory computer-readable medium of claim 17, further comprising one or more computer-executable instructions that, when executed by the at least one processor of a computing device, cause the computing device to generate the computing model of targeted content recommendations by:
- receiving, from a digital content system, content recommendation information that is specific to one or more of a user of a client media player or a location of the client media player;
- receiving, from the digital content system, a manifest of targeted content items corresponding to the content recommendation information; and
- generating the computing model of targeted content recommendations based on the content recommendation information and the manifest of targeted content items.

19. The non-transitory computer-readable medium of claim 17, further comprising one or more computer-executable instructions that, when executed by the at least one processor of a computing device, cause the computing device to, in response to receiving the initial length of targeted content, buffering the initial length of targeted content until the targeted content initialization marker is detected in the live stream.

20. The non-transitory computer-readable medium of claim 17, further comprising one or more computer-executable instructions that, when executed by the at least one processor of a computing device, cause the computing device to:
- detecting a targeted content insertion signal in the live stream prior to detecting the targeted content initialization marker; and
- loading the initial length of targeted content for splicing into the live stream at the targeted content initialization marker.

* * * * *